United States Patent [19]

Levine

[11] Patent Number: 4,880,713

[45] Date of Patent: Nov. 14, 1989

[54] RELEASABLE BATTERY PACK CAP AND HOLDER

[75] Inventor: Morris M. Levine, Scarsdale, N.Y.

[73] Assignee: International Consumer Brands, Inc., Trumbull, Conn.

[21] Appl. No.: 117,701

[22] Filed: Nov. 5, 1987

[51] Int. Cl.⁴ .................. H01M 2/10; H01M 6/42; H01R 11/00

[52] U.S. Cl. ................................. 429/100; 429/96

[58] Field of Search ............... 429/96, 97, 98, 99, 429/100; 439/556

[56] References Cited

U.S. PATENT DOCUMENTS

| | | | |
|---|---|---|---|
| 2,712,120 | 6/1955 | Cochran | 439/556 |
| 3,370,987 | 2/1968 | Rush | 429/98 |
| 3,881,961 | 5/1975 | Nation | 429/100 X |
| 4,206,274 | 6/1980 | Peels | 429/99 |
| 4,527,110 | 7/1975 | McCarty et al. | 429/99 X |
| 4,738,906 | 4/1988 | Sanders | 429/100 X |

Primary Examiner—John D. Lee
Assistant Examiner—Phan T. Heartney
Attorney, Agent, or Firm—Kramer, Brufsky & Cifelli

[57] ABSTRACT

A releasable battery pack cap and holder for a rechargeable battery operated power tool. The power tool includes a battery compartment for receiving a rechargeable battery pack. A cap includes a cavity formed therein for receiving at least a portion of the rechargeable battery pack. The cavity in the cap is configured to releasably secure the battery so that the battery can be easily removed from the battery compartment by gripping the cap. Clamps are supported on the battery compartment for releasably returning the cap to the battery compartment when a battery pack is retained in the battery compartment.

12 Claims, 2 Drawing Sheets

RELEASABLE BATTERY PACK CAP AND HOLDER

BACKGROUND OF THE INVENTION

This invention is directed to a releasable battery pack cap and holder for a battery operated power tool and, in particular, to a cap that permits a rechargeable battery pack to be easily inserted into and removed from a battery compartment of a battery operated power tool.

In recent years, battery operated power tools utilizing rechargeable battery packs have become very popular. Such battery packs typically include from two to six rechargeable nickle-cadmium batteries that are housed in a rechargeable battery pack. When the power tool is not being utilized, the rechargeable battery pack can be removed from the power tool housing, placed into a charging unit that recharges the batteries in the battery pack so that a recharged battery pack can be replaced into the power tool.

Handling the rechargeable battery pack when it is removed from the power tool and returned to the power tool is often found to be difficult and unwieldy. Heretofore, a door, a plate or a spring clip have been used to secure the rechargeable battery in the battery chamber of the power tool. However, such arrangements are unweildy to open and close. Furthermore, the battery pack is difficult to remove and handle. Accordingly, an effective battery cap and holder that will facilitate removal and handling of a rechargeable battery pack from a handheld power tool and that forms part of the power tool is desired.

SUMMARY OF THE INVENTION

Generally speaking, in accordance with the instant invention, a releasable battery pack cap and holder for a battery operated power tool is provided in accordance with the instant invention. A housing for a battery tool is configured to define a battery chamber for receiving a battery pack. A cap having a cavity formed therein is constructed and arranged to receive at least a portion of the battery pack in the cavity. The cavity is configured to define an interference fit with the battery pack so that the battery pack is releasably secured therein. At least one resilient clamp is mounted to the housing and is adapted to releasably secure the cap means to the housing.

In a preferred embodiment of the invention, the cap is released from the clamping member when it is desired to remove the battery pack from the battery chamber. Because the interference fit between the cap and the battery pack is greater than the interference fit between the battery and the housing battery chamber surrounding the battery, the rechargeable battery pack is removed from the housing and returned to the rechargeable battery means by the cap which holds the rechargeable battery pack during removal and replacement of the battery pack in the power tool.

Accordingly, it is an object of the instant invention to provide an improved releasable battery pack holder.

It is a further object of the instant invention to provide an improved cap for the battery pack compartment of a battery operated power tool.

It is still a further object of the instant invention to provide a battery cap and holder that facilitates removal of a battery pack from a handheld power tool and handling of the battery pack during charging and replacement of the battery pack into the power tool.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
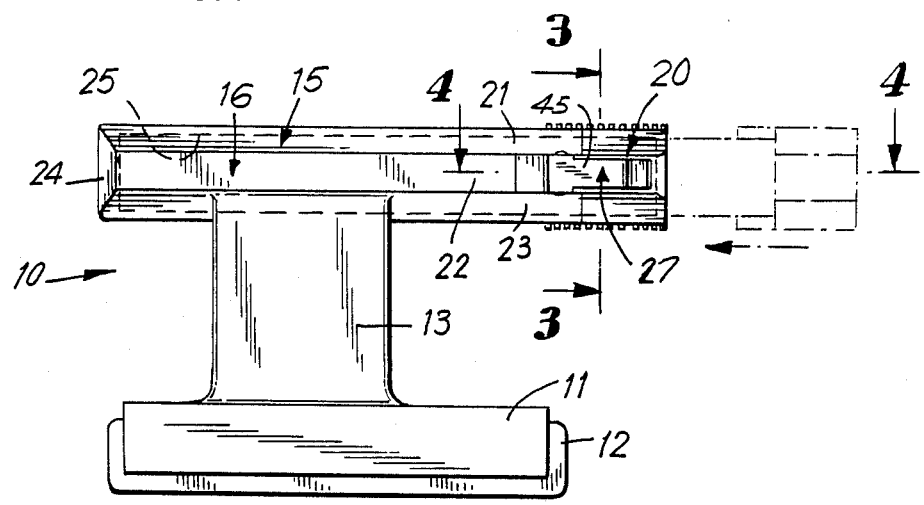
FIG. 1 is an elevational view of a power tool including a releasable battery pack cap and holder constructed in accordance with a preferred embodiment of the instant invention.
Figure 2:
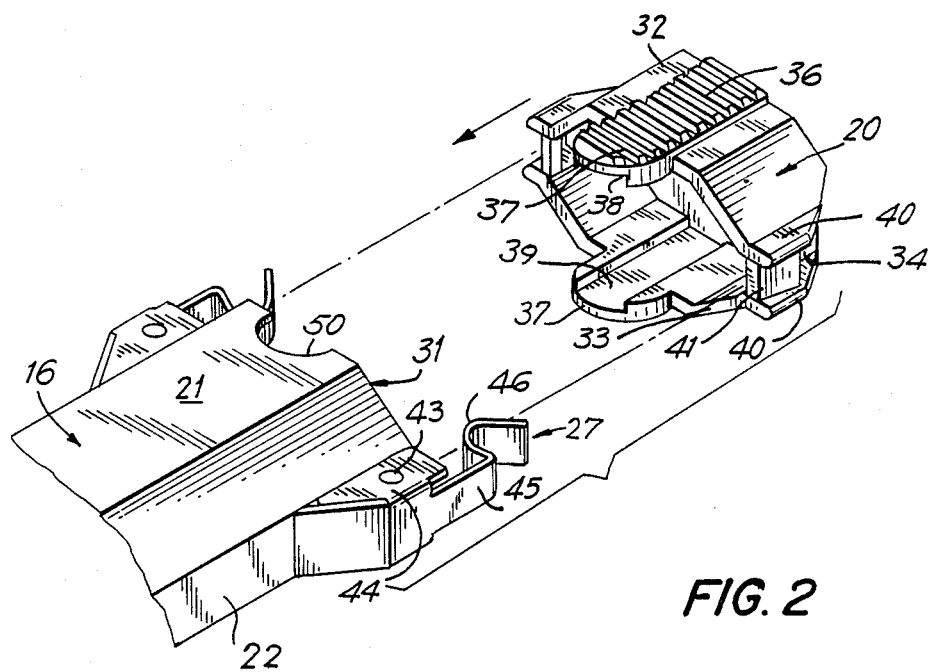
FIG. 2 is a partial perspective view of the battery cap and holder and associated housing structure cooperating therewith constructed in accordance with a preferred embodiment of the instant invention.

Reference is made to FIG. 1 wherein a rechargable battery-operated electric sander, generally indicated at 10, is depicted. Sander 10 includes a base support 11 which releasably retains sandpaper 12 therein. An upright housing 13 is supported on base support 11 and includes therein a motor (not shown) and a switch (not shown) for driving the electric sander.

A handle assembly, generally indicated as 15, is supported by upright housing 13 and includes a battery compartment, generally indicated as 16, a cap, generally indicated as 20, and a clamping mechanism, generally indicated as 27.

As is explained in greater detail below, the instant invention is directed to battery compartment 16, cap 20, retaining clamp mechanism 27, a rechargeable battery 30 (FIGS. 3 and 4) and the cooperation of these elements with respect to each other. Although an electric sander is depicted in FIG. 1, such depiction is by way of example only, it being understood that the instant invention is equally applicable to any battery operated power tool that receives a releasable rechargeable battery pack in the housing thereof.

Referring to all of the FIGS., the battery housing 16 includes a top wall 21, side walls 22, bottom wall 23 and end wall 24, each of which are adapted to define a battery compartment illustrated by dashed line 25 in FIG. 1. Battery compartment 25 is adapted to receive therein a battery pack 30. Battery pack 30 is conventional and includes therein six rechargeable nickle-cadmium batteries that are adapted to be connected through conventional contacts (not shown) to a motor (not shown) in the power tool to energize the power tool during use. Battery pack 30 includes an elongated projection 30a that orients the battery pack to assure that the battery is properly oriented when it is inserted into the battery compartment. Top wall 21, bottom wall 23, side wall 22 and end wall 24 each define an elongated battery compartment opening, generally indicated at 31, for receiving the battery pack and permitting the battery pack to be inserted into the battery compartment 25.

On the side walls 22 are symmetrically formed laterally projecting shoulders 26. Retaining clamp mechanism includes clamps 27, formed of spring steel. Each clamp 27 includes a base 44 that is secured to shoulder 26 by a pin screw 43. Each clamp further includes an extended arm 45 and a bended knee 46.

Battery cap 20 includes a top wall 32, a bottom wall 33, side walls 34 and an endwall 35, each of which are integrally formed together to define a cavity for receiving therein the end of battery pack 30. Top wall 32 and bottom wall 33 are symmetrical and each include a raised knurled surface 36. The raised knurled surfaces are provided to permit the operator's fingers to easily grip the cap. A projection 37 is provided in top wall 32 and bottom wall 33, which projections are adapted to extend in part into cut recess 50 formed in top wall 21 and a similar recess 51 formed in bottom wall 23 of the battery compartment.

Figure 3:
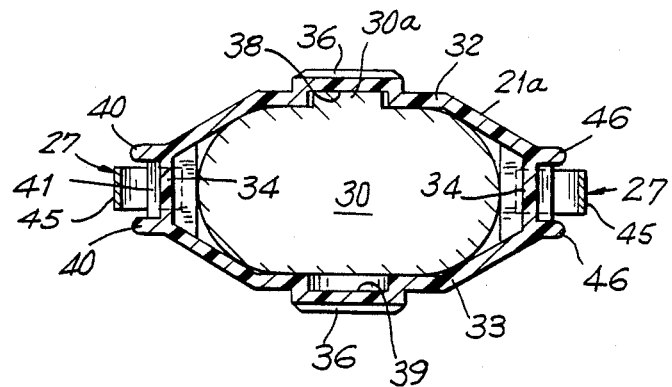
FIG. 3 is a sectional view taken along line 3—3 of FIG. 1.

The inner surface of top wall 32 and bottom wall 33 each include a recessed slot 38 and 39, respectively. As illustrated in FIG. 3, recessed slot 38 is configured to receive therein the elongated projection 30a of the battery pack 30. By making top wall 32 and bottom wall 33 symmetrical, the cap can be turned upside down without in any way hampering the efficiency thereof.

Projecting from side walls 34 on each side of the cap are laterally disposed flanged walls 40. Flange wall 40 on each side defines a camming wall 41 and clamping recess 42.

Figure 4:
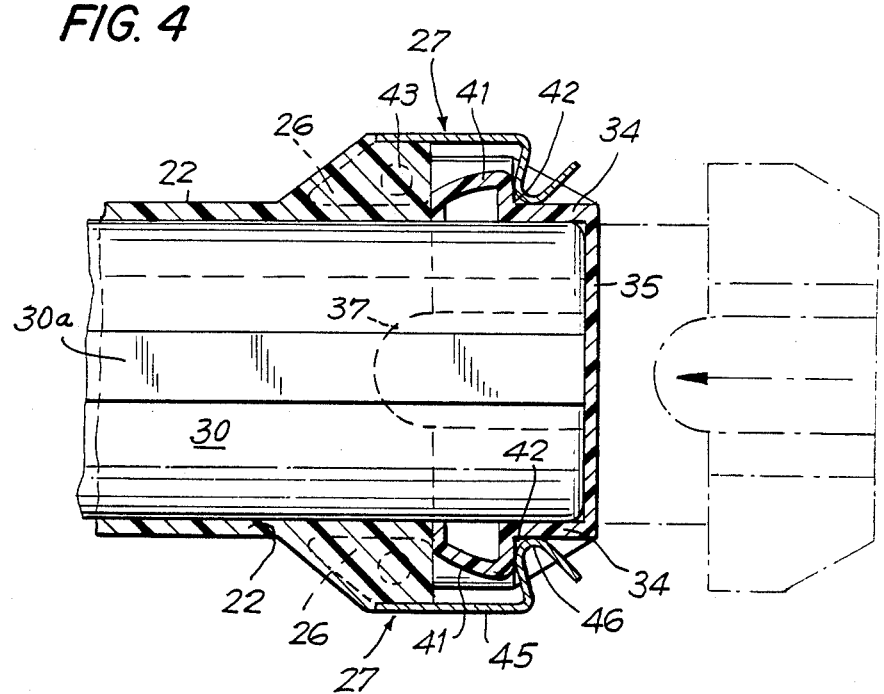
FIG. 4 is a sectional view taken along line 4—4 of FIG. 3.

As is best illustrated in FIG. 4, the cap 20 is secured to the battery compartment housing 16 by clamps 21. Specifically, the extended arm 45 of each spring clamp 21 is resilient. Accordingly, when the cap is brought into engagement with the housing, knee 46 is biased outward by the cap's camming wall 41 until the knee 46 clears the end of the camming wall and is resiliently biased into recess 42 thereby securing the cap against the housing. When it is desired to release the cap, the spring clamps 21 are gripped at the knees 46 and spread apart so that the cap can be released from the housing.

As is illustrated in FIG. 3, the battery receiving cavity defined in cap 20 is configured to receive about a quarter to one inch of the end of the battery pack therein. The cavity is toleranced to define an interference fit with the battery pack. Accordingly, if it is desired to insert the battery pack into the housing, the battery pack is first inserted into the cap which will retain the battery pack therein by reason of the interference fit therebetween. Thereafter, the battery pack can be held by the cap and inserted into the battery compartment 25 until cap 20 is retained by clamping springs 21 so that the battery pack is retained within the battery compartment.

Also, in order to prevent the battery pack from moving once it is inserted into the battery pack, the tolerance between the outside dimensions of the battery pack and the battery compartment are usually designed to afford a close fit so that movement is prevented but a sufficient clearance so that the rechargeable battery pack can be easily removed. Accordingly, the tightness of the interference fit between the cap and the battery pack must be greater than the tolerance between the battery compartment and the battery pack of the power tool so that the battery pack can easily be removed from the battery compartment by merely releasing the cap from clamping spring 21. Once the clamping springs are removed from recesses 42, the cap is released and the battery pack can be easily removed by gripping the cap 20 and pulling the battery pack from battery compartment 25.

By this configuration, the battery cap becomes an integral part of the structure of the battery compartment in the power tool when the power tool is in use. Nevertheless, because it is often necessary to remove the battery pack from the battery compartment, such removal is facilitated by the use of a battery cap and holder. Furthermore, the facility with which the battery pack can be removed and disposed into a charging mechanism and then replaced into the power tool is enhanced by the battery cap and holder of the instant invention.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A releasable battery pack holder for a battery operated power tool comprising in combination, housing means including a chamber for receiving a battery pack, separate cap means having a cavity formed therein for receiving at least a portion of said battery pack therein, said cavity being configured to snugly but releasably secure a battery pack therein so that the battery pack can be removed from said chamber by gripping said cap means and pulling the battery therefrom without the battery becoming released from the cap, and means for releasably mounting said cap to said housing when the battery pack is in said chamber.

2. A releasable battery pack holder, as claimed in claim 1, wherein said means for releasably mounting said cap comprises clamping means secured to said housing means, said clamping means being adapted to resiliently engage said cap means to said housing means so that a battery pack can be securely releasably mounted within said housing means.

3. A releasable battery pack holder, as claimed in claim 2, wherein said cap means includes receiving means and at least said clamping means is adapted to be disposed in said receiving means for releasably securing said cap means to said housing means when the battery pack is disposed in the housing and cap means.

4. A releasable battery pack holder, as claimed in claim 3, wherein said clamping means includes a spring metal clip with a knee-shaped bend, and said receiving means includes a camming wall adjacent a recess, said clamping means and camming wall being constructed and arranged so that when the cap means is secured to the housing means, the knee-shaped bend slides over the camming wall and is resiliently biased into the recess.

5. A releasable battery pack holder, as claimed in claim 1, wherein said housing defines at least a partially hollow handle of the power tool for defining said battery pack chamber therein.

6. A releasable battery pack holder, as claimed in claim 1, wherein said cap means has an outside surface which includes raised knurled portions to facilitate gripping thereof.

7. The releasable battery pack holder, as claimed in claim 1, wherein said battery pack is rechargeable.

8. The releasable battery pack holder, as claimed in claim 1, wherein the cavity in said cap means engages a portion of the battery pack with an interference fit and the battery pack chamber is configured to provide substantially no interference with said battery, when said battery is disposed therein.

9. The releasable battery pack holder of claim 1 further comprising means for enabling a battery pack to be received into said battery pack chamber in only a predetermined orientation.

10. The releasable battery pack holder of claim 9 wherein said enabling means comprises an elongated projection on one of said battery pack and chamber and a mating slot on the other of said battery pack and chamber.

11. The releasable battery pack holder of claim 10 wherein said cap means comprises symmetrical mating means for receiving said battery pack in more than one orientation.

12. The releasable battery pack holder of claim 9 wherein said cap means is configured to receive said battery pack in more than one orientation.

* * * * *